United States Patent
Zhang et al.

(10) Patent No.: US 8,770,064 B2
(45) Date of Patent: Jul. 8, 2014

(54) WAVE GENERATOR FOR WAVE GEAR DEVICE

(75) Inventors: Xin Yue Zhang, Azumino (JP); Toshimi Yamagishi, Azumino (JP); Keiji Ueura, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 154 days.

(21) Appl. No.: 13/616,318

(22) Filed: Sep. 14, 2012

(65) Prior Publication Data

US 2013/0079190 A1 Mar. 28, 2013

Related U.S. Application Data

(63) Continuation-in-part of application No. 12/652,217, filed on Jan. 5, 2010, now abandoned.

(30) Foreign Application Priority Data

Jan. 13, 2009 (JP) .................................. 2009-004452

(51) Int. Cl.
*F16H 33/00* (2006.01)
(52) U.S. Cl.
USPC ......................................................... 74/640
(58) Field of Classification Search
USPC ........................................................... 74/640
See application file for complete search history.

(56) References Cited

U.S. PATENT DOCUMENTS

| | | | |
|---|---|---|---|
| 4,715,247 A | 12/1987 | Honda et al. | |
| 4,776,708 A | 10/1988 | Carlson | |
| 4,909,098 A * | 3/1990 | Kiryu | 74/640 |
| 6,167,783 B1 * | 1/2001 | Ishikawa | 74/640 |
| 6,526,849 B1 * | 3/2003 | Ishikawa | 74/640 |
| 7,117,759 B2 | 10/2006 | Ishikawa | |
| 7,735,396 B2 * | 6/2010 | Ishikawa et al. | 74/640 |
| 7,748,118 B2 | 7/2010 | Kobayashi et al. | |
| 7,891,272 B2 | 2/2011 | Schonlau | |
| 8,020,470 B2 | 9/2011 | Saito | |
| 8,028,603 B2 | 10/2011 | Ishikawa | |
| 8,051,566 B2 | 11/2011 | Kobayashi et al. | |

FOREIGN PATENT DOCUMENTS

| | | |
|---|---|---|
| JP | 02-91238 U | 7/1990 |
| JP | 05-172195 A | 7/1993 |
| JP | 08-166052 A | 6/1996 |

* cited by examiner

*Primary Examiner* — Ha D Ho
(74) *Attorney, Agent, or Firm* — Buchanan Ingersoll & Rooney

(57) ABSTRACT

The flexible bearing of the wave generator for a wave gear device is a deep-groove ball bearing in which an outer race and an inner race form an annular flexible bearing ring capable of bending in a radial direction. A ball diameter Da is set to be 5 to 15% greater than that of each model of the currently available product. Dimensions of orbital plane radii ro, ri of the inner and outer races are set so that the ratio ro/Da of the orbital plane radius ro of the inner race and the ball diameter Da, as well as the ratio ri/Da of the orbital plane radius ri of the outer race and the ball diameter Da, are both in the range of 0.51 to 0.52. With this configuration, the service life of the flexible bearing can be extended.

2 Claims, 4 Drawing Sheets

WAVE GENERATOR FOR WAVE GEAR DEVICE

CROSS-REFERENCE TO RELATED APPLICATIONS

The present application is a continuation-in-part of U.S. Ser. No. 12/652,217, filed on Jan. 5, 2010, which claims the priority of JP 2009-004452, filed in Japan on Jan. 13, 2009. The entire contents of U.S. Ser. No. 12/652,217 and JP 2009-004452 are incorporated herein by reference.

TECHNICAL FIELD

The present invention relates to a wave generator for a wave gear device, and more particularly relates to a technique for attaining a long service life in a flexible bearing, which is an essential part of the wave generator, in order to extend the service life of the wave gear device.

BACKGROUND ART

A wave gear device comprises a rigid internally toothed gear, a flexible externally toothed gear disposed on the inside of the internally toothed gear, and a wave generator that bends the flexible externally toothed gear into an elliptical shape and causes the externally toothed gear to partially mesh with the rigid internally toothed gear. When the wave generator is rotated by a motor or the like, the positions where the two toothed gears are enmeshed with each other move in a circumferential direction, and relative rotation whose speed is reduced in accordance with the difference in the number of teeth between the toothed gears is generated between the two toothed gears. One of the gears is nonrotatably fixed to allow reduced-speed rotation to be output and transmitted to the load from the other toothed gear.

The wave generator comprises a rigid plug attached to a motor axle or the like, and a flexible bearing mounted on an elliptical external circumferential surface of the rigid plug. The flexible bearing has the same structure as a typical radial ball bearing, but the inner and outer races of the flexible bearing form a flexible bearing ring capable of bending in a radial direction. The flexible bearing is mounted between the elliptical external circumferential surface of the rigid plug and an internal circumferential surface of the flexible externally toothed gear. The flexible bearing holds the rigid plug and the flexible externally toothed gear in a state in which the plug and the gear can rotate relative to each other.

Wave gear devices can be divided into three types: flat type, cup type, and "silk hat" type, according to the shape of the flexible externally toothed gear. These types of wave gear device are disclosed in Patent Documents 1, 2, and 3.

[Patent Document 1] JP-A 05-172195
[Patent Document 2] JP-A 08-166052
[Patent Document 3] JP-U 02-91238

Wave gear devices have few components, highly precise rotary transmission, and a high reduction ratio; therefore, they are incorporated and used in drive mechanisms for robot arms and the like. In recent years, there has been a growing demand for higher-performance, higher-speed robots, and this has been accompanied by a growing demand for a higher performance, and particularly for an extended service life, in wave gear devices. In order to extend the service life of wave gear devices, it is essential to extend the service life of the flexible bearing in a wave generator in which the flexible externally toothed gear is rotationally moved while being bent.

However, up until the present time, no consideration has been given to extending the service life of flexible bearings in which the inner and outer races are rotated while being bent in the radial direction. Specifically, it has been a few decades since the wave gear device has come into practical use, but the components constituting the flexible bearing have merely been used unmodified all this time without any changes being made to their dimensions.

An object of the present invention is to improve the flexible bearing that rotates while bending in a radial direction in a wave gear device, and to extend the service life of the bearing.

SUMMARY

In order to solve the abovementioned problems, the present disclosure provides a wave generator for a wave gear device wherein a flexible externally toothed gear disposed inside an annular rigid internally toothed gear is bent into a non-circular shape and caused to partially mesh with the rigid internally toothed gear to move the meshing positions of the two toothed gears in a circumferential direction and to generate relative rotation between the two toothed gears brought about by a difference in the number of teeth of the two toothed gears, the wave generator comprising:

a rigid plug; and an annular flexible bearing bent into a non-circular shape by a non-circular external circumferential surface of the rigid plug;

wherein the flexible bearing is a deep-groove ball bearing having an annular flexible outer race and flexible inner race capable of bending in a radial direction;

wherein model numbers of the wave gear device are set as shown in table below according to pitch circle diameters of the flexible externally toothed gears, and the ball diameter $D_a$ of the flexible bearing is set as shown in the table according to each model number of the wave gear device; and wherein dimensions of orbital plane radii $r_o$, $r_i$ of the inner and outer races are set so that the ratio $r_o/D_a$ of the orbital plane radius $r_o$ of the inner race and the ball diameter $D_a$, as well as the ratio $r_i/D_a$ of the orbital plane radius $r_i$ of the outer race and the ball diameter $D_a$, are both in the range of 0.51 to 0.52 in each model of the wave gear device as shown in the table.

TABLE

| Model No. | PCD (mm) of Flexible Externally Toothed Gear | Ball Diameter $D_a$ (mm) | $r_o/D_a$ | $r_i/D_a$ |
|---|---|---|---|---|
| 8 | 20.320 | 2.1-2.3 | 0.51-0.52 | 0.51-0.52 |
| 11 | 28.222 | 2.5-2.7 | | |
| 14 | 34.925 | 3.3-3.7 | | |
| 17 | 43.180 | 4.2-4.6 | | |
| 20 | 50.800 | 5.0-5.5 | | |
| 25 | 63.500 | 5.8-6.4 | | |
| 32 | 82.550 | 7.5-8.2 | | |
| 40 | 101.600 | 10.0-10.9 | | |
| 45 | 114.300 | 11.5-12.6 | | |
| 50 | 127.00 | 12.5-13.7 | | |
| 58 | 147.320 | 14.2-15.5 | | |
| 65 | 165.100 | 15.0-16.4 | | |
| 80 | 203.200 | 20.0-21.9 | | |
| 90 | 228.600 | 22.5-24.6 | | |
| 100 | 254.00 | 25.0-27.4 | | |

In the present disclosure, the ball diameter $D_a$ is set to dimensions 5% to 15% greater than the dimensions of each model of the currently available product, and dimensions of orbital plane radii ro, ri of the inner and outer races are set so that the ratios ro/Da and ri/Da are each 0.8% to 2% less than those ratios in each model of the currently available product.

Typically, the rigid plug comprises an elliptical external circumferential surface, and the flexible bearing and the flexible externally toothed gear are bent into an elliptical shape.

The present inventors conducted a study into changes in the rated life of each model number of wave gear device according to the present invention and each corresponding model number of a currently available wave gear device by changing the ball diameter and conformity (ro/Da, ri/Da) of the flexible bearing of the wave generator. As a result, it was determined that making the ball diameter 5 to 15% greater relative to the dimensions of each model of the currently available product, as well as setting the dimensions of the orbital plane radii ro, ri of the inner and outer races so that the conformity is 0.51 to 0.52, makes it possible to increase the rated life by a factor of 5 or greater.

Therefore, according to the present disclosure, it is possible to extend the service life of the flexible bearing in a wave generator, and therefore to substantially extend the service life of the wave gear device in comparison with the conventional art.

MODE FOR CARRYING OUT THE INVENTION

Described below with reference to the accompanying drawings is a long-lasting, flexible bearing of a wave generator in a wave gear device to which the present invention is applied.

Figure 1:
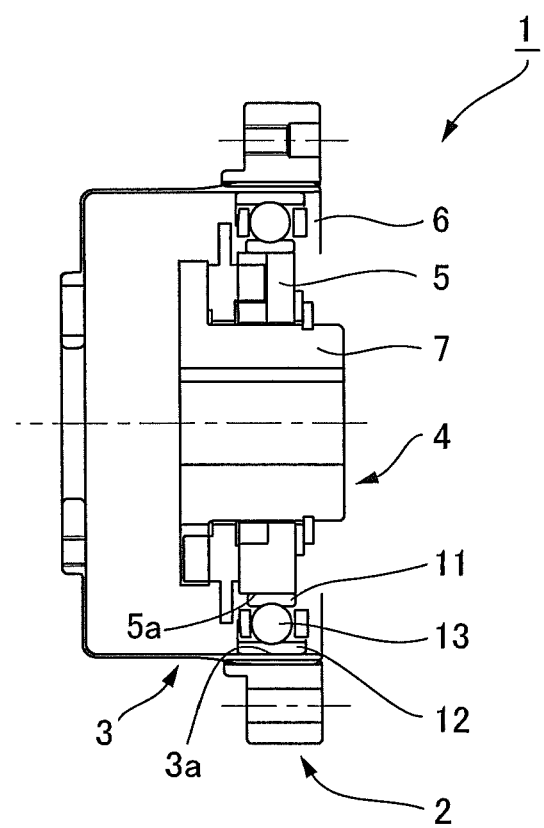
FIG. 1 is a view depicting a cup-type wave gear device to which the present invention can be applied.

FIG. 1 is an illustrative diagram showing one example of a wave gear device to which the present invention can be applied. The wave gear device 1 shown in the drawing is a cup-type device comprising a rigid internally toothed gear 2, a cup-shaped flexible externally toothed gear 3 disposed on the inside of the internally toothed gear 2, and a wave generator 4 that bends the flexible externally toothed gear 3 into an elliptical shape and causes the externally toothed gear 3 to partially mesh with the rigid internally toothed gear 2. The difference in the number of teeth between the toothed gears 2, 3 is 2n (where n is a positive integer). As a general rule, the difference is 2 and the rigid internally toothed gear 2 has the greater number of teeth.

When the wave generator 4 is rotated at high speed by a motor or the like (not shown), the positions where the toothed gears 2, 3 are enmeshed with each other move in a circumferential direction, generating a decrease in the speed of relative rotation between the toothed gears 2, 3 that corresponds to the difference in the number of teeth between the toothed gears 2, 3. It is possible to make one of the gears a fixed gear that does not rotate, thereby causing the other gear to output rotation at a reduced speed and transmit the rotation to the load side.

The wave generator 4 comprises a rigid plug 5 and a flexible bearing 6 mounted on an elliptical external circumferential surface 5a of the rigid plug 5. The rigid plug 5 is attached to a hub 7 so as to integrally rotate therewith. The hub 7 is fixedly connected to a motor axle or the like. The flexible bearing 6 has the same structure as a typical deep-groove ball bearing, but the inner race 11 and outer race 12 of the flexible bearing form a flexible bearing ring capable of bending in a radial direction, and balls 13 can roll and move along a track formed between the races. The flexible bearing 6 is mounted between the elliptical external circumferential surface 5a of the rigid plug 5 and the internal circumferential surface 3a of a portion of the flexible externally toothed gear 3 on which the external teeth are formed. The flexible bearing 6 holds the rigid plug 5 and the flexible externally toothed gear 3 while allowing the plug and the gear to rotate relative to each other.

Figure 2:
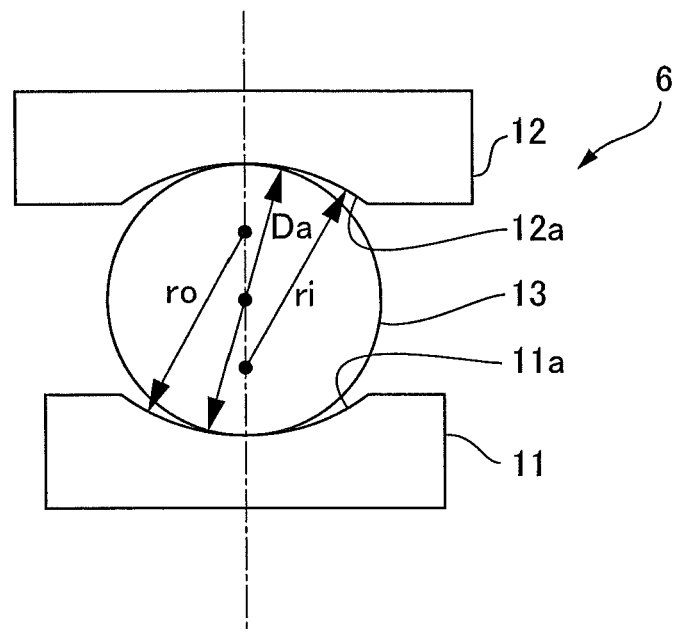
FIG. 2 is a partial cross-sectional view of a flexible bearing of the wave gear device of FIG. 1.

FIG. 2 is a partial cross-sectional view of the flexible bearing 6. As shown in the drawing, the basic structure of the flexible bearing 6 is the same as a typical deep-groove ball bearing; however, ball diameter and conformity (the ratio between the radii of the orbital planes of the inner and outer races and the ball diameter) is different from the dimensions of currently available products. In FIG. 2, the ball diameter is Da, the orbital plane radius of the orbital plane 11a of the inner race 11 is ro, and the radius of the orbital plane 12a of the outer race 12 is ri.

The ball diameter Da of the balls 13 fitted into the flexible bearing 6 is set to a dimension that is 5% to 15% greater than the ball diameters of each model of the currently available product, as shown in Table below. The dimensions of the orbital plane radii ro, ri of the inner and outer races 11, 12 are set so that the conformity on the side of the inner race 11 (the ratio ro/Da of the orbital plane radius ro of the inner race and the ball diameter Da) and the conformity on the side of the outer race 12 (the ratio ri/Da of the orbital plane radius ri of the outer race and the ball diameter Da) are both 0.51 to 0.52 in each model of the currently available product. In Table, pitch circle diameters of the flexible externally toothed gear in each model are shown, as well as ball diameters of the way bearing in each model of the currently available product. The value of conformity in each model of the currently available product is approximately between 0.52 and 0.53.

TABLE

| Model NO. | PCD (mm) of Flexible Externally Toothed Gear | Ball Dia. (mm) of Flexible Bearing of Currently Available Product | Ball Dia. Da (mm) Of Flexible Bearing of Present Invention | ro/Da of Flexible Bearing of Present Invention | ri/Da of Flexible Bearing of Present Invention |
|---|---|---|---|---|---|
| 8 | 20.320 | 2.000 | 2.1-2.3 | 0.51-0.52 | 0.51-0.52 |
| 11 | 28.22 | 2.381 | 2.5-2.7 | | |
| 14 | 34.925 | 3.175 | 3.3-3.7 | | |
| 17 | 43.180 | 4.000 | 4.2-4.6 | | |
| 20 | 50.800 | 4.763 | 5.0-5.5 | | |
| 25 | 63.500 | 5.556 | 5.8-6.4 | | |
| 32 | 82.550 | 7.144 | 7.5-8.2 | | |

TABLE-continued

| Model NO. | PCD (mm) of Flexible Externally Toothed Gear | Ball Dia. (mm) of Flexible Bearing of Currently Available Product | Ball Dia. Da (mm) Of Flexible Bearing of Present Invention | ro/Da of Flexible Bearing of Present Invention | ri/Da of Flexible Bearing of Present Invention |
|---|---|---|---|---|---|
| 40 | 101.600 | 9.525 | 10.0-10.9 | | |
| 45 | 114.300 | 11.000 | 11.5-12.6 | | |
| 50 | 127.00 | 11.906 | 12.5-13.7 | | |
| 58 | 147.320 | 13.494 | 14.2-15.5 | | |
| 65 | 165.100 | 14.288 | 15.0-16.4 | | |
| 80 | 203.200 | 19.050 | 20.0-21.9 | | |
| 90 | 228.600 | 21.431 | 22.5-24.6 | | |
| 100 | 254.00 | 23.813 | 25.0-27.4 | | |

Figure 3:
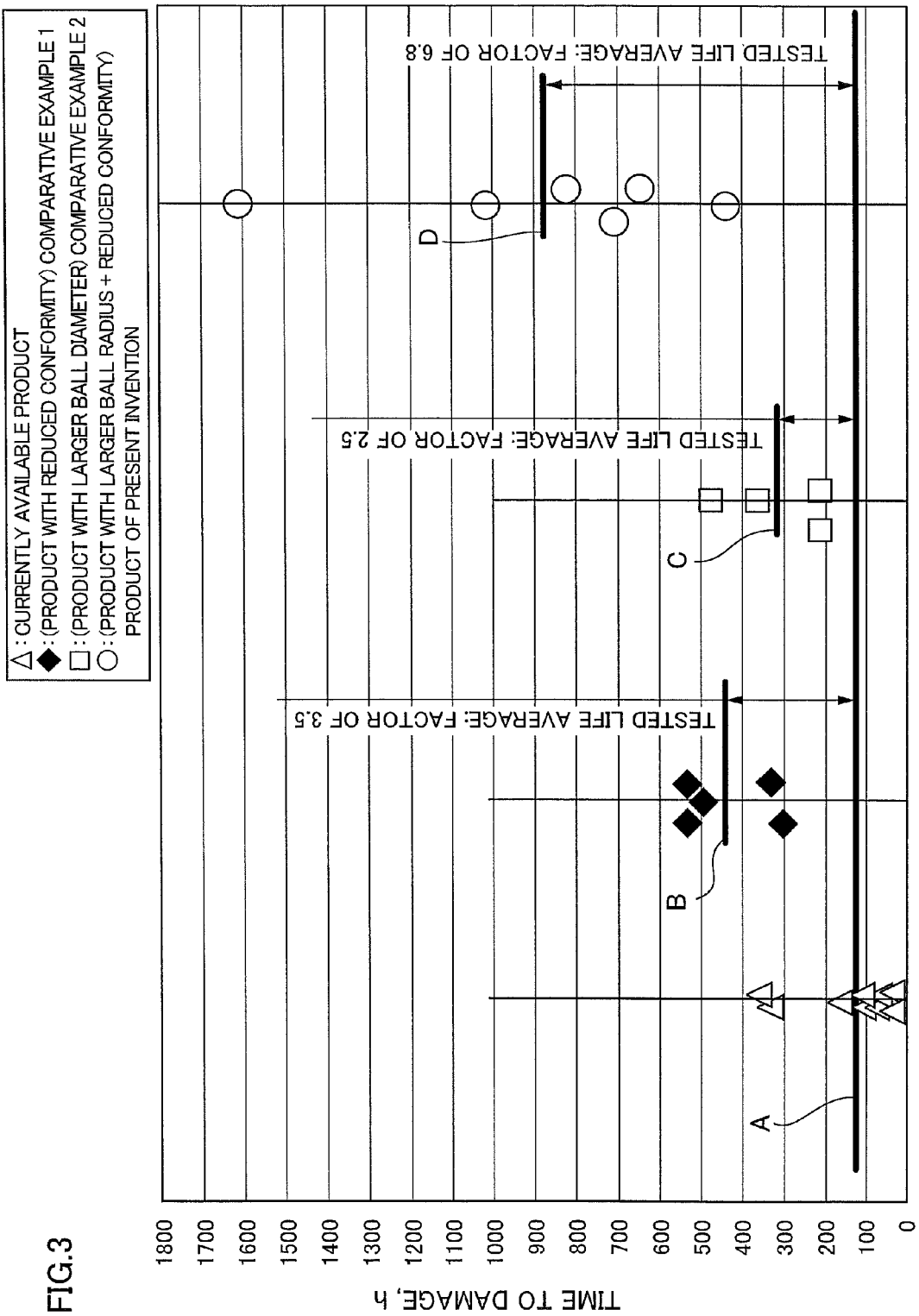
FIG. 3 is a graph showing endurance test results for the flexible bearing according to an embodiment of the present invention.

FIG. 3 is a graph showing one example of results of a test conducted by the present inventors on the fatigue life of the flexible bearing. The fatigue life test measured the amount of time for damage to occur when the currently available product, comparative example 1, comparative example 2, and the product of the present invention were operated under identical conditions. Relative to the conformity and the ball diameter of the flexible bearing in the currently available product, the radii of the orbital planes of the inner and outer races were set so that only the conformity was changed to 0.51 in comparative example 1 compared to the currently available product, only the ball diameter was 11% greater in comparative example 2 than in the currently available product, and the conformity was 0.51 and the ball diameter was 11% greater in the product of the present invention. The other conditions were identical, and the materials used were also identical.

In the graph, horizontal line A is the average life of the currently available product, horizontal line B is the average life of comparative example 1, horizontal line C is the average life of the comparative example 2, and horizontal line D is the average life of the product of the present invention. The average life increased by factors of 3.5 and of 2.5 in comparative examples 1, 2, respectively, and the average life increased by a factor of 6.8 in the product of the present invention. Therefore, it is clear that the present invention makes it possible to substantially lengthen the life of the flexible bearing 6.

Figure 4:
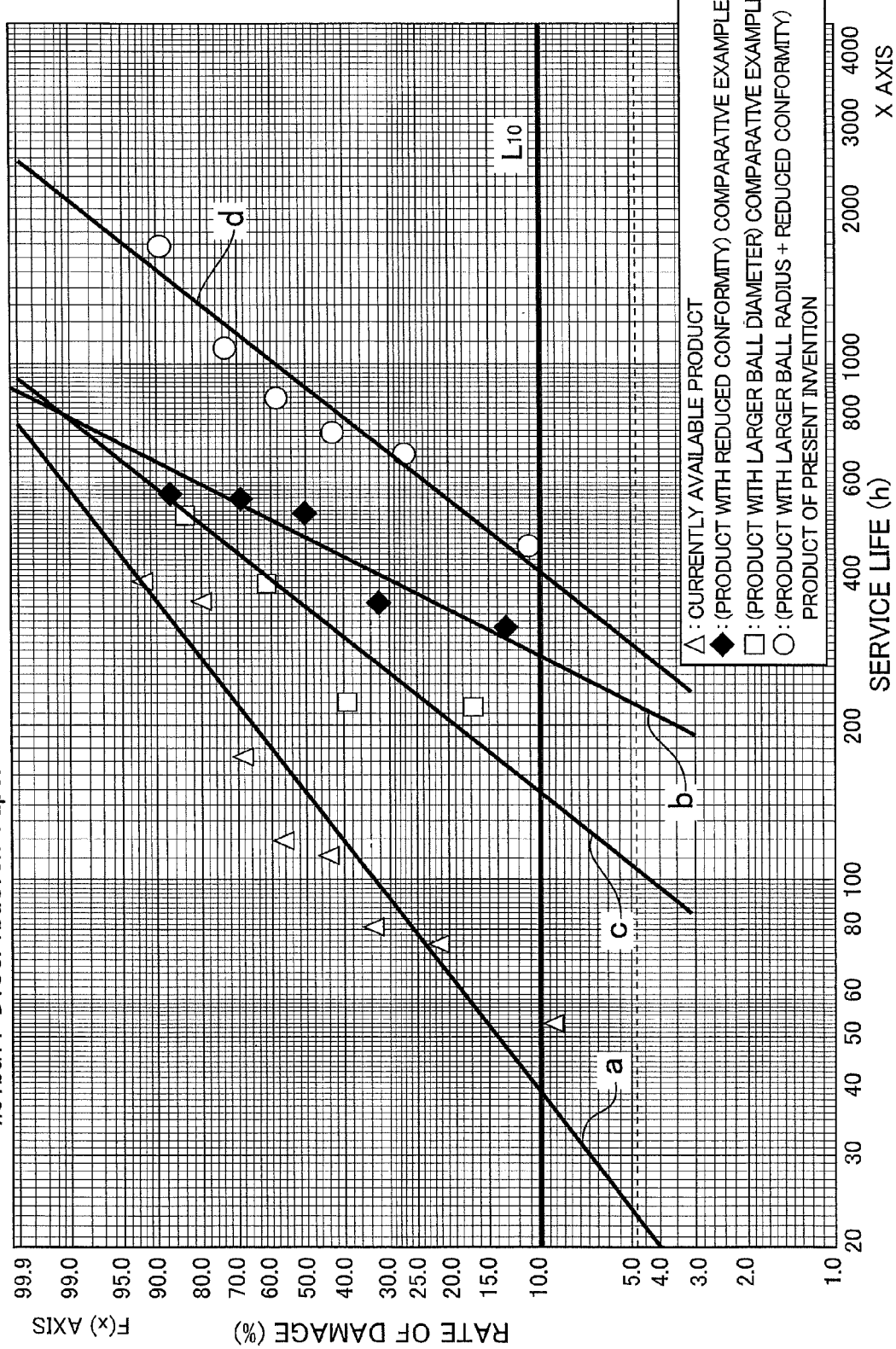
FIG. 4 is a graph showing endurance test results for the flexible bearing according to an embodiment of the present invention.

FIG. 4 is a graph displaying the results of fatigue life tests on the above four types of flexible bearings, wherein the vertical axis is used as the coordinate axis for the rate of damage (%), and the horizontal axis is used as the coordinate axis for the service life (hours). The straight lines a to d are approximation lines showing the rate of damage in relation to the desired operation time for the currently available product, comparative example 1, comparative example 2, and the product of the present invention, respectively. The rated life $L_{10}$ of the product of the present invention is substantially improved relative to that of the currently available product, comparative example 1, and comparative example 2. Moreover, the relative increase of the rate of damage in relation to the operation time is lower than for comparative examples 1, 2.

The experiments conducted by the present inventors confirmed that the service life of a flexible bearing can be extended by a factor of 5 or greater over that of the currently available product by making the ball diameter 5 to 15% greater and setting the conformity to be 0.51 to 0.52.

The invention claimed is:

1. A wave generator for a wave gear device wherein a flexible externally toothed gear disposed inside an annular rigid internally toothed gear is bent into a non-circular shape and caused to partially mesh with the rigid internally toothed gear to move the meshing positions of the two toothed gears in a circumferential direction and to generate relative rotation between the toothed gears brought about by a difference in the number of teeth of the two toothed gears, comprising:
   a rigid plug; and
   an annular flexible bearing bent into a non-circular shape by a non-circular external circumferential surface of the rigid plug;
   wherein the flexible bearing is a deep-groove ball bearing having an annular flexible outer race and flexible inner race capable of bending in a radial direction;
   wherein pitch circle diameters PCD of the flexible externally toothed gear of each model of the wave gear device are set as shown in Table below, and the ball diameters Da of the flexible bearing are set as shown in the Table according to each model of the wave gear device; and
   wherein dimensions of orbital plane radii ro, ri of the inner and outer races are set so that the ratio ro/Da of the orbital plane radius ro of the inner race and the ball diameter Da, as well as the ratio ri/Da of the orbital plane radius ri of the outer race and the ball diameter Da, are both in the range of 0.51 to 0.52 in each model of the wave gear device as shown in the Table:

TABLE

| Model No. | PCD (mm) of Flexible Externally Toothed Gear | Ball Diameter Da (mm) | ro/Da | ri/Da |
|---|---|---|---|---|
| 8 | 20.320 | 2.1-2.3 | 0.51-0.52 | 0.51-0.52 |
| 11 | 28.22 | 2.5-2.7 | | |
| 14 | 34.925 | 3.3-3.7 | | |
| 17 | 43.180 | 4.2-4.6 | | |
| 20 | 50.800 | 5.0-5.5 | | |
| 25 | 63.500 | 5.8-6.4 | | |
| 32 | 82.550 | 7.5-8.2 | | |
| 40 | 101.600 | 10.0-10.9 | | |
| 45 | 114.300 | 11.5-12.6 | | |
| 50 | 127.00 | 12.5-13.7 | | |
| 58 | 147.320 | 14.2-15.5 | | |
| 65 | 165.100 | 15.0-16.4 | | |
| 80 | 203.200 | 20.0-21.9 | | |
| 90 | 228.600 | 22.5-24.6 | | |
| 100 | 254.00 | 25.0-27.4. | | |

2. The wave generator for a wave gear device according to claim 1, wherein
   the rigid plug comprises an elliptical external circumferential surface; and
   the flexible bearing is bent into an elliptical shape.

* * * * *